(12) United States Patent
Gottmann et al.

(10) Patent No.: US 12,304,263 B2
(45) Date of Patent: May 20, 2025

(54) MOTOR VEHICLE HAVING A SUSPENSION STRUT

(71) Applicant: Bayerische Motoren Werke Aktiengesellschaft, Munich (DE)

(72) Inventors: Helmut Gottmann, Hohenthann / Schmatzhausen (DE); Juergen Schippan, Assling (DE); Tatjana Schoierer, Haimhausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/558,815

(22) PCT Filed: Apr. 26, 2022

(86) PCT No.: PCT/EP2022/060952
§ 371 (c)(1),
(2) Date: Nov. 3, 2023

(87) PCT Pub. No.: WO2022/242989
PCT Pub. Date: Nov. 24, 2022

(65) Prior Publication Data
US 2024/0239147 A1    Jul. 18, 2024

(30) Foreign Application Priority Data
May 21, 2021 (DE) ............ 10 2021 113 350.5

(51) Int. Cl.
*B60G 13/00* (2006.01)
(52) U.S. Cl.
CPC ...... *B60G 13/003* (2013.01); *B60G 2204/128* (2013.01); *B60G 2204/4404* (2013.01); *B60G 2206/8207* (2013.01)

(58) Field of Classification Search
CPC ............ B60G 13/003; B60G 2204/128; B60G 2204/4404; B60G 2206/8207; B60G 2204/43; B60G 15/067; B62D 25/088
See application file for complete search history.

(56) References Cited

U.S. PATENT DOCUMENTS 11,760,422 B2 *   9/2023   Hennessey ........... B62D 25/088
                                                              280/124.155
2005/0093286 A1   5/2005   Oh
(Continued)

FOREIGN PATENT DOCUMENTS

DE    10 2004 038 656 A1    6/2005
DE    10 2012 113 161 A1    2/2014
(Continued)

OTHER PUBLICATIONS

International Search Report (PCT/ISA/210) issued in PCT Application No. PCT/EP2022/060952 dated Jul. 1, 2022 with English translation (6 pages).
(Continued)

*Primary Examiner* — Drew J Brown
(74) *Attorney, Agent, or Firm* — Crowell & Moring LLP

(57) ABSTRACT

A connection of a suspension strut to a body of a motor vehicle is provided. Motor vehicles, and in particular passenger motor vehicles, have a suspension strut for each wheel. The lower end region of the suspension strut is joined to the wheel suspension, while the upper end region of the suspension strut is connected to the body of the motor vehicle. For this purpose, the upper end region of the suspension strut has a holder by which the suspension strut is connected to the body. The holder is detachably connected to a body element of the body that extends substantially in parallel with the longitudinal extent of the suspension strut in the flat connecting region.

20 Claims, 3 Drawing Sheets

(56) References Cited

U.S. PATENT DOCUMENTS

| | | | |
|---|---|---|---|
| 2009/0058032 A1 | 3/2009 | Croyle et al. | |
| 2011/0266765 A1* | 11/2011 | Nowak | B60G 11/16 |
| | | | 280/124.154 |
| 2011/0309594 A1* | 12/2011 | Zohar | B60G 13/005 |
| | | | 280/124.109 |
| 2014/0015284 A1 | 1/2014 | Mildner et al. | |
| 2014/0049019 A1 | 2/2014 | Ahn et al. | |
| 2020/0369140 A1 | 11/2020 | McCarron et al. | |
| 2021/0061368 A1* | 3/2021 | Satoh | B62D 25/088 |
| 2022/0297761 A1* | 9/2022 | Hennessey | B62D 29/008 |

FOREIGN PATENT DOCUMENTS

| | | | | |
|---|---|---|---|---|
| DE | 10 2015 215 765 A1 | 2/2017 | | |
| DE | 10 2019 216 993 A1 | 5/2021 | | |
| DE | 102020117193 B3 * | 11/2021 | | B62D 25/088 |
| EP | 0 037 326 A1 | 6/2016 | | |
| FR | 3 006 243 A1 | 11/2018 | | |
| FR | 3 093 026 A1 | 8/2020 | | |
| WO | WO 2014/074053 A1 | 5/2014 | | |

OTHER PUBLICATIONS

German-language Written Opinion (PCT/ISA/237) issued in PCT Application No. PCT/EP2022/060952 dated Jul. 1, 2022 with English translation (12 pages).
German-language Office Action issued in German Application No. 10 2021 113 350.5 dated Jan. 31, 2022 (5 pages).
Cover page of EP 2 917 053 A1 published Sep. 16, 2015 (1 page).

* cited by examiner

MOTOR VEHICLE HAVING A SUSPENSION STRUT

BACKGROUND AND SUMMARY

The invention relates to a motor vehicle having a suspension strut.

An attachment of a suspension strut to a body of a motor vehicle, as is implemented in a similar manner in most modern passenger motor vehicles, is already known from DE 10 2012 113 161 A1.

It is an object of the invention to provide a motor vehicle having at least one suspension strut which is attached to a body of the motor vehicle in a simple manner.

This object is achieved by a motor vehicle having a suspension strut with the features of the independent claims.

Motor vehicles, and in particular passenger motor vehicles, typically have one suspension strut for each wheel. Usually, a shock absorber is also additionally provided for each wheel. This shock absorber may be integrated in the suspension strut or embodied as a separate component. The lower end region of the suspension strut is attached to the wheel suspension while the upper end region of the suspension strut is attached to a body of the motor vehicle. For this purpose, the upper end region of the suspension strut has a holder by way of which the suspension strut is attached to the body. This holder may be a separate component which is connected to the suspension strut, or else may be integrated in the suspension strut. According to the invention, the holder is releasably attached to a bodywork element of the body, which in the planar attachment region extends substantially parallel to the longitudinal extent of the suspension strut.

In contrast, the suspension strut in the known prior art is always attached to a suspension strut receptacle which in the attachment region extends largely perpendicularly to the longitudinal extent of the suspension strut. The suspension strut here predominantly transmits forces in its longitudinal extent. Accordingly, the attachment of the suspension strut is predominantly stressed in terms of tension and compression. Therefore, the known suspension strut receptacles have to be designed to be very stiff, and have corresponding wall thicknesses and/or additional reinforcements.

In contrast, in the assembly according to the invention, the direction of force in the longitudinal extent of the suspension strut is parallel to the attachment region of the bodywork element. The attachment is thus stressed by a tensile shearing load. This does not require such an extremely stiff design of the bodywork element in the attachment region as in the case of a suspension strut receptacle in the prior art, which is stressed in terms of tension and compression.

The planar bodywork element, to which the holder is attached, in the attachment region advantageously extends substantially in the vehicle longitudinal direction and in the vehicle vertical direction. In this way, the installation space in the vehicle transverse direction, which is required for attaching the suspension strut, is significantly less than in the case of a suspension strut receptacle known from the prior art. This is particularly advantageous in a passenger motor vehicle, because the available width in the trunk is thus particularly large. The width of the trunk in a passenger motor vehicle is limited by the left and the right wheel arch. In the case of suspension strut receptacles known from the prior art, these two wheel arches, which are stressed in terms of tension and compression, have to be configured to be particularly stiff, thus requiring more installation space than in the case of the attachment according to the invention, the latter being primarily stressed by a tensile shearing load. Therefore, the wheel arches can be designed so as to be somewhat narrower in the case of an attachment according to the invention, so that the trunk can be wider.

The attachment of the suspension strut to the planar bodywork element is performed using a releasable connection technique. The connection should be releasable so as to, in the event of damage to the suspension strut or optionally the axle, be able to easily remove or replace the suspension strut, or the axle, without the interconnected components being destroyed when the attachment is released. Therefore, the holder is favorably screwed to the bodywork element exclusively by screws. Threaded connections are a releasable connection technique which is simple and proven. Threaded connections enable a connection between two components to be rapidly and reliably established and released. The connection herein is the more cost-effective, the fewer screws need to be used. According to one advantageous design embodiment, two screws suffice for fastening the holder to the body. These two screws are preferably disposed on mutually opposite sides of the suspension strut.

The planar bodywork element is ideally composed of a sheet metal component which in the screw-on region is stiffened by a sheet metal reinforcement plate. The bodywork element to which the suspension strut is attached has to be able to absorb relatively high forces without any undesirable deformation arising. For this purpose, either the entire bodywork element can be sized to be correspondingly stiff and thus thick, or a thinner sheet metal component which in the screw-on region is stiffened by a sheet metal reinforcement plate is favorably used. The sheet metal component and the sheet metal reinforcement plate here can be welded to one another. This is a very cost-effective and reliable connection technique which has proven successful in bodywork construction. The sheet metal component and the sheet metal reinforcement plate ideally enclose a common cavity. For this purpose, the sheet metal reinforcement plate, by way of the peripheral region thereof, bears in an encircling manner on the sheet metal component, and by way of the peripheral region is connected to the sheet metal component. Such an assembly of two sheet metal components is particularly stiff. The peripheral region of the sheet metal reinforcement plate, by way of an encircling flange, ideally bears in a planar manner on the sheet metal component so that welding of the two components along the flange is possible.

The sheet metal component can advantageously form at least part of a wheel arch shell. A wheel arch shell surrounds a wheel of the motor vehicle. In the case of a rear wheel, the wheel arch shell serves to protect the vehicle interior, or the trunk, from dirt and splash water. At the same time, the wheel arch shell has an aerodynamic function. The wheel arch shell is intended to minimize as far as possible air turbulences in the region of the wheel.

When the holder is screwed to the bodywork element which comprises the sheet metal part and the sheet metal reinforcement plate, a nut, a bushing or thread into which the screw for attaching the suspension strut to the bodywork element can be screwed must be provided on the bodywork element. Bushings into which the screws are screwed are advantageously welded to the bodywork element. Incorporating such bushings in a sheet metal component by welding is a commonplace process in modern bodywork construction.

The bushings advantageously extend at least between the sheet metal component and the sheet metal reinforcement plate; the bushings thus protrude into the cavity formed conjointly by the sheet metal component and the sheet metal reinforcement plate. The bushings can favorably be welded to the sheet metal reinforcement plate and/or to the sheet metal component. Additionally, the bushings in the screw-in direction are ideally supported in a form-fitting manner on the sheet metal reinforcement plate or on the sheet metal component.

Further advantageous design embodiments are the subject matter of dependent claims.

An exemplary embodiment of the invention, by means of which the invention will be described in more detail hereunder, is illustrated in the drawings.

DETAILED DESCRIPTION OF THE DRAWINGS

Figure 1:
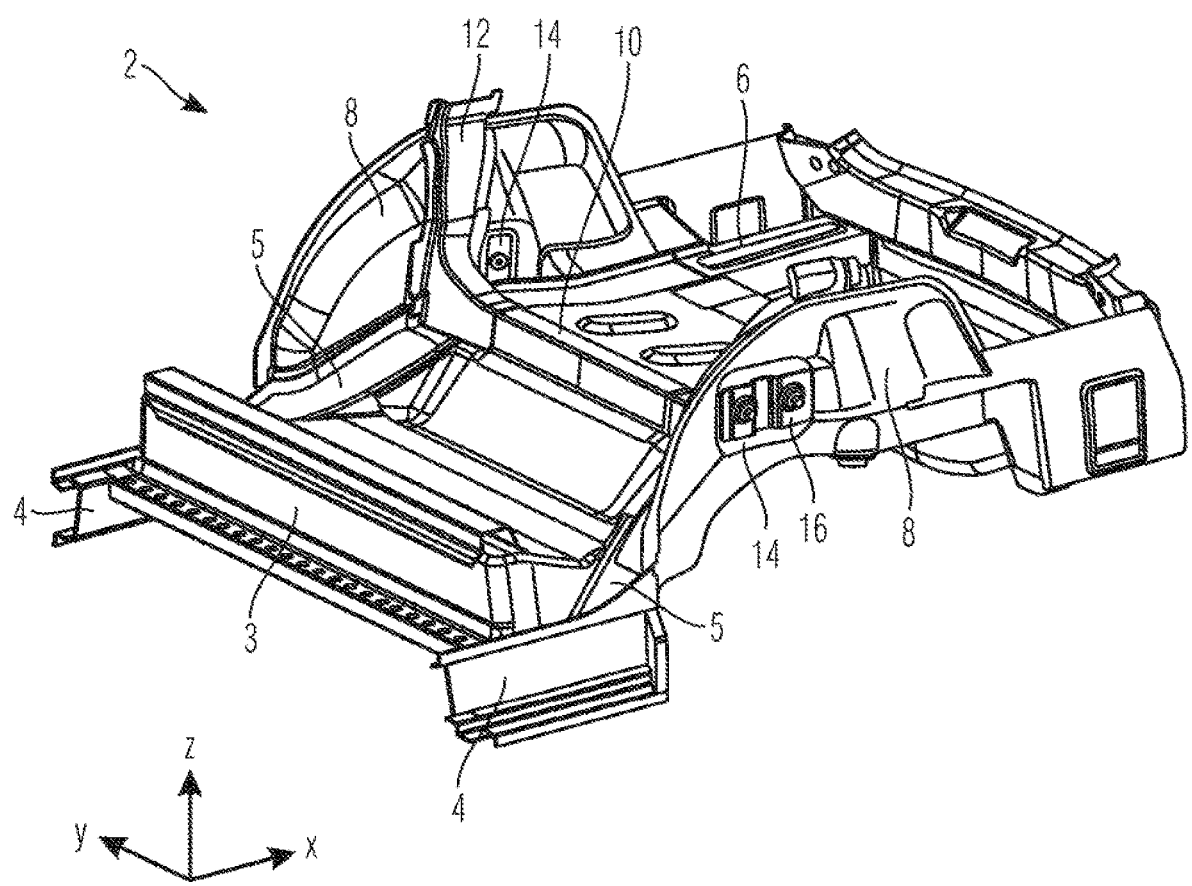
FIG. 1 is a perspective view of a rear portion of a body of a passenger motor vehicle.

A rear end 2 of a body of a passenger motor vehicle is illustrated in FIG. 1. When viewed in the direction of travel, the rear end 2 adjoins the rear of a passenger cabin, the front of the latter in turn being adjoined by a front end. The rear end 2 by way of the rear end region thereof forms the vehicle rear. The lower sub-region of the rear end 2 is predominantly illustrated in FIG. 1.

Shown in FIG. 1 is not only the rear end 2 but also the rear lower end region of the passenger cabin. The passenger cabin is on both sides delimited by a rocker panel 4 which in the vehicle longitudinal direction x extends up to a rear wheel arch. The rear end regions of the two rocker panels 4 are connected to a seat crossmember 3 which extends in the vehicle transverse direction y.

The rear end 2 comprises a left and a right rear longitudinal member 6, which at the rear end regions thereof serve for receiving a rear bumper. The rocker panels 4 and the rear longitudinal members 6 are in each case connected to a cast bracket 5 which extends primarily in the vehicle longitudinal direction x, connecting the rear end region of the rocker panel 4 about the wheel arch to the front end region of the rear longitudinal member 6. The wheel arch here is delimited by a wheel arch shell 8 which bears on the cast bracket 5 and is connected to the latter. The cast brackets 5 and the wheel arch shells 8 are associated with the rear end 2. In order to stiffen the rear end 2, the two cast brackets 5 in the region of the wheel arches are connected to one another by way of a crossmember 10. The crossmember 10 in the vehicle transverse direction y extends parallel to the seat crossmember 3. The attachment of the crossmember 10 to the respective cast bracket 5 is on both sides performed by way of a reinforcement 12 of the wheel arch, which in the vehicle vertical direction z additionally extends upward along the wheel arch shell 8 and is connected to the wheel arch shell 8.

Figure 2:
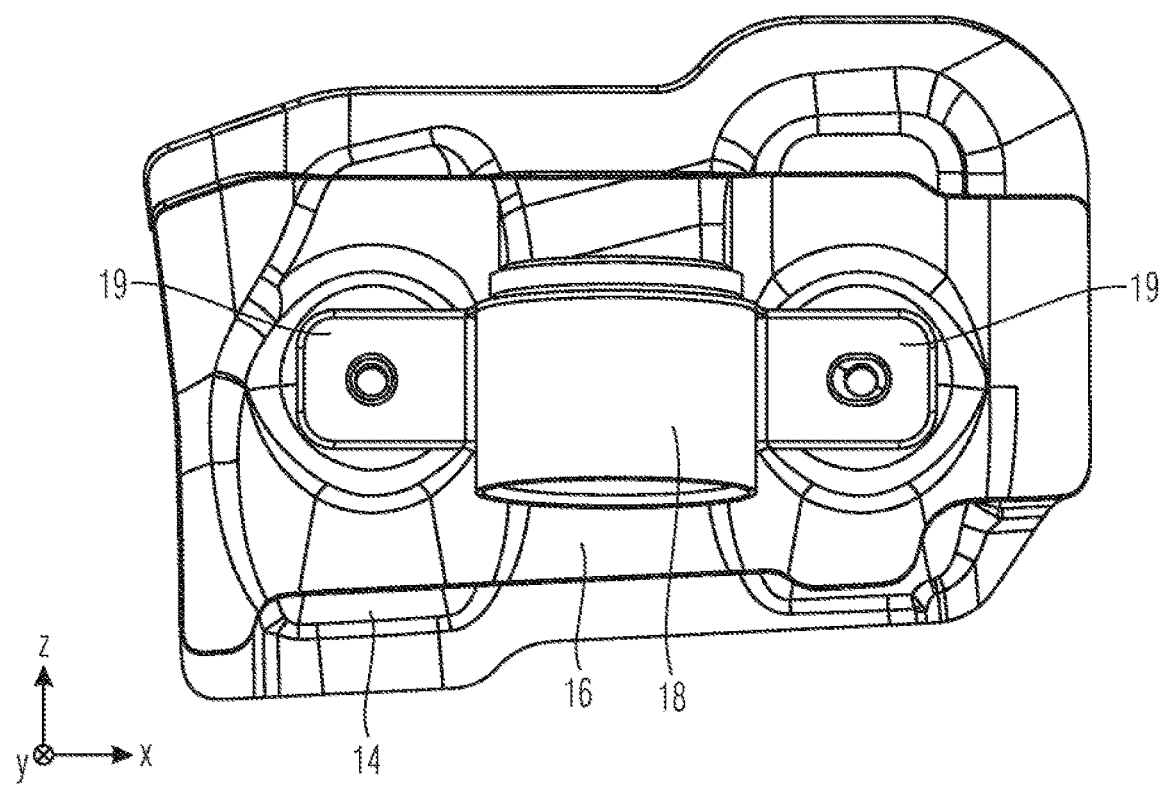
FIG. 2 is a perspective detailed view of an attachment region for a suspension strut on the body.
Figure 3:
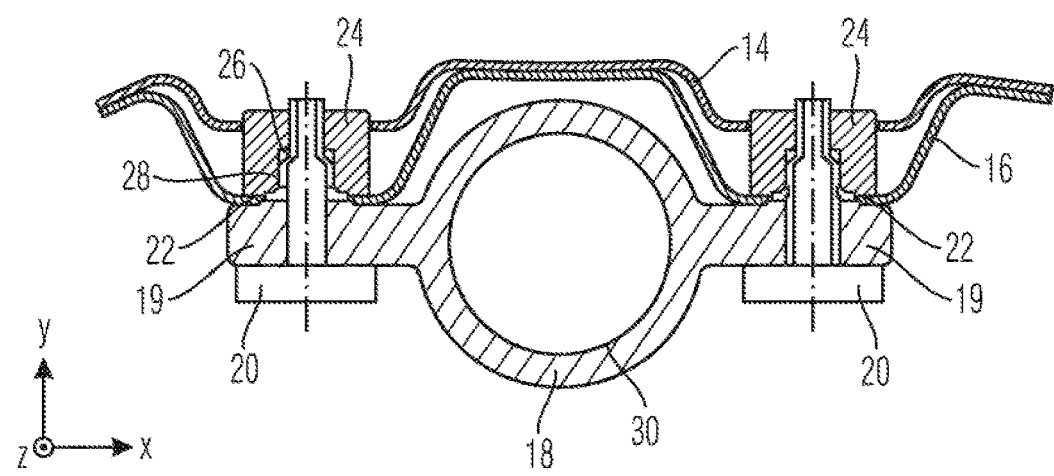
FIG. 3 is a section view through the attachment region shown in FIG. 2.

The wheel arch shell 8 surrounds a wheel arch in which a rear wheel—not shown in FIG. 1—of the passenger motor vehicle is disposed. This rear wheel is supported on the body by way of a suspension strut—likewise not illustrated. The lower end region of the suspension strut here is connected to the rear wheel while the upper end region is fastened to the body. As shown in FIGS. 2 and 3, a holder 18, having an annular receptacle 30 which surrounds the upper end region of the suspension strut, serves for fastening. The diameter of the upper end region of the suspension strut here is smaller than the diameter of the suspension strut in the central region adjoining therebelow. The holder 18 has two mutually opposite fastening flanges 19 which project radially from the annular receptacle 30 and extend in each case in the vehicle vertical direction z and in the vehicle longitudinal direction x. The holder 18, by way of the two fastening flanges 19 thereof, bears in a planar manner on a bodywork element of the body, which in the planar attachment region extends substantially parallel to the longitudinal extent of the suspension strut.

The bodywork element on which the holder 18 bears is formed by a sheet metal component 14 and a sheet metal reinforcement plate 16. The sheet metal component 14 is inserted into a clearance in the wheel arch shell 8. For this purpose, the sheet metal component 14 has an encircling flange by way of which the former bears in a planar manner about the clearance on the wheel arch shell 8 and is welded to the latter. In turn, the sheet metal reinforcement plate 16 by way of an encircling flange bears on the sheet metal component 14, wherein the sheet metal component 14 and the sheet metal reinforcement plate 16 at least in the fastening region for the holder 18 are mutually spaced apart in the vehicle transverse direction y.

The holder 18 is screwed to the bodywork element by two screws 20. The two screws 20, or the shanks of the two screws 20, respectively, here extend primarily in the vehicle transverse direction y. The two screws 20 are in each case screwed into a bushing 24 which is welded to the bodywork element. The sheet metal reinforcement plate 16 has a through-bore 22, the screw 20 protruding through the latter. On the side of the sheet metal reinforcement plate 16 that lies opposite the holder 18, the bushing 24 bears on the sheet metal reinforcement plate 16 and is welded to the latter. The external diameter of the bushing 24 here is larger than the through-bore 22. The bushing 24 has an internal thread into which the front portion of the shank of the screw 20 is screwed.

The bushing 24, proceeding from the sheet metal reinforcement plate 16, extends in the vehicle transverse direction y up to the sheet metal component 14, to which the bushing 24 is likewise welded. The bushing 24 even protrudes slightly beyond the sheet metal component 14, into a trunk of the passenger motor vehicle.

The screws 20 have a stepped screw shank. The screw shank adjacent to the screw head does not have a thread and has a larger diameter than the shank portion which is adjacent thereto and has a thread and also forms the free end of the screw shank. Situated between the thicker shank portion without a thread and the thinner shank portion with a thread is a continuous transition region 26 which serves as an introduction ramp. The bushing 24, on the side thereof facing the sheet metal reinforcement plate 16, in turn has a sink 28, the diameter of the latter being only slightly larger than that of the thicker shank portion of the screw 20. For assembling, each screw 20, by way of the free thinner shank portion, is first inserted through a through-bore in the fastening flange 19 of the holder 18. Owing to the transition region 26 serving as an introduction ramp, the screw 20 is automatically centered in the holder 18 as well as in the bushing 24 in the process, thus guaranteeing that the holder 18 is assembled on the bodywork element with a precise fit.

This is a very simple possibility for attaching a suspension strut to a body of a passenger motor vehicle in the region of a wheel arch. The great advantage lies in that the suspension strut is connected to the body exclusively in the vehicle transverse direction y by way of a holder 18 which may also be embodied to be integral to the suspension strut. Two screws 20 which in the vehicle transverse direction y are screwed into bushings 24 connected to the body are sufficient for this purpose. The holder 18 here bears on the body in a plane which is defined in the vehicle longitudinal direction x and the vehicle vertical direction z. In this way, the attachment is stressed primarily by a tensile shearing load.

This type of attachment of the suspension strut to the body in the vehicle transverse direction saves installation space in particular in the vehicle transverse direction y, and owing to the two screws 20 merely required is able to be established in a particularly rapid and cost-effective manner. This new type of attachment is also particularly advantageous in the event of a repair because the screws 20 are accessible from the wheel arch. Therefore, no trim parts have to first be removed in the trunk in order to gain access to the attachment points of the suspension strut on the body, as is required in the prior art.

Figure 4:
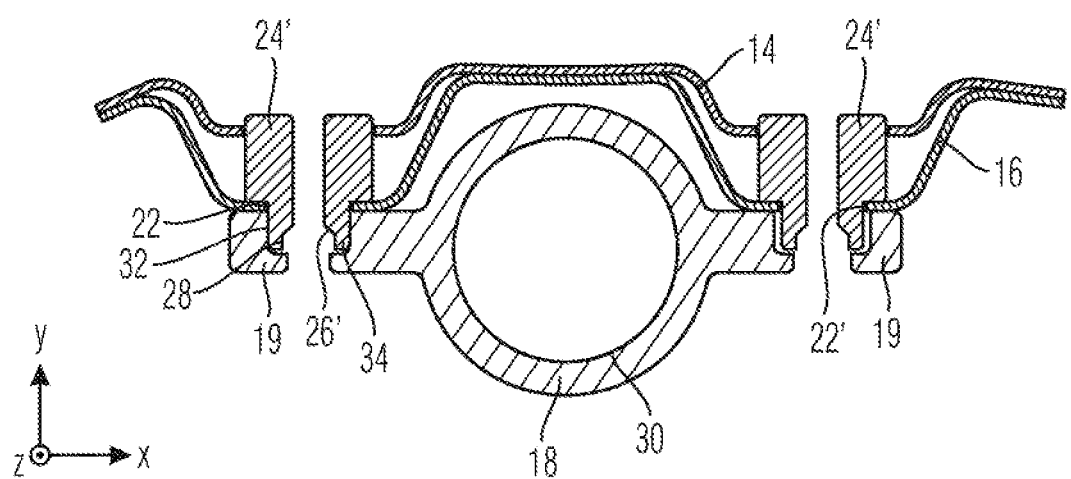
FIG. 4 shows an alternative embodiment of the attachment region shown in section in FIG. 3 for a suspension strut on the body.

Shown in FIG. 4 is an embodiment as an alternative to the design embodiment shown in FIG. 2 and FIG. 3. Here, all identical components have the same reference signs. The bushings 24' have a somewhat different shape. They have a cylindrical projection 34, the latter protruding through the through-bore 22 in the sheet metal reinforcement plate 16 into a sink 32 in the fastening flange 19 of the holder 18. The external diameter of the cylindrical projection 34 here is smaller than the external diameter of the remaining part of the bushing 24' between the sheet metal reinforcement plate 16 and the sheet metal component 14, so that the bushing 24', when viewed in the vehicle transverse direction y, furthermore bears in a form-fitting encircling manner about the through-bore 22 on the sheet metal reinforcement plate 16. In this way, the bushings 24' produce a form-fit with the holder 18 and can serve, for example, for the preliminary positioning of the holder 18 during assembling, before the screws 20 are screwed in.

Both embodiments enable a suspension strut to be attached to a body by only two screws 20 which are screwed-in in the vehicle transverse direction y. The holder 18 here bears on the bodywork element of the body, to which the holder 18 is screwed, in a plane in the vehicle longitudinal direction x and in the vehicle vertical direction z. The enables an attachment of the suspension strut in a cost-effective manner that saves installation space.

LIST OF REFERENCE SIGNS

2 Rear end
3 Seat crossmember
4 Rocker panel
5 Cast bracket
6 Rear longitudinal member
8 Wheel arch shell
10 Crossmember
12 Reinforcement of wheel arch
14 Sheet metal component
16 Sheet metal reinforcement plate
18 Holder of suspension strut
19 Fastening flange
20 Screw
22 Through-bore
24 Bushing
24' Bushing
26 Transition region
26' Transition region
28 Sink
30 Annular receptacle
32 Sink
34 Cylindrical projection

What is claimed is:

1. A motor vehicle, comprising:
a bodywork element of a body of the motor vehicle;
a suspension strut having an upper end region; and
a holder configured for the upper end region of the suspension strut, the holder fastening the suspension strut to the body, and
wherein the holder is releasably attached to the bodywork element of the body that extends substantially in parallel with a longitudinal extent of the suspension strut in a planar attachment region,
wherein the planar bodywork element is composed of a sheet metal component which, in a screw-on region, is stiffened by a sheet metal reinforcement plate, and
wherein the sheet metal component and the sheet metal reinforcement plate have at least one common flange bearing against one another and are connected to one another in a planar manner.

2. The motor vehicle according to claim 1, wherein the bodywork element in the planar attachment region extends substantially in a longitudinal direction and in a vertical direction of the vehicle.

3. The motor vehicle according to claim 1, wherein the holder is releasably attached to the bodywork element exclusively by screws.

4. The motor vehicle according to claim 3, wherein all of said screws are screwed in substantially in a transverse direction of the vehicle.

5. The motor vehicle according to claim 1, wherein the sheet metal component forms at least part of a wheel arch shell, and the holder is releasably attached to the bodywork element exclusively by screws.

6. The motor vehicle according to claim 1, further comprising: bushings, into which screws are screwed, wherein the bushings are welded to the sheet metal component and/or to the sheet metal reinforcement plate.

7. The motor vehicle according to claim 6, wherein the bushings extend at least between the sheet metal component and the sheet metal reinforcement plate.

8. The motor vehicle according to claim 7, wherein the bushings are welded to the sheet metal reinforcement plate and/or to the sheet metal component.

9. The motor vehicle according to claim 8, wherein the bushings, in the screw-in direction, are supported in a form-fitting manner on the sheet metal reinforcement plate or on the sheet metal component.

10. The motor vehicle according to claim 6, wherein at least one of the bushings has a portion which protrudes into a matching clearance in the holder.

11. The motor vehicle according to claim 10, wherein an external diameter of the at least one bushing, between the sheet metal reinforcement plate and the sheet metal component, is larger than in the portion that protrudes into the holder.

12. The motor vehicle according to claim 1, wherein the holder is fastened to the planar bodywork element exclusively by two screws.

13. The motor vehicle according to claim 12, wherein the two screws are disposed on mutually opposite sides of the suspension strut.

14. A motor vehicle, comprising:
    a bodywork element of a body of the motor vehicle;
    a suspension strut having an upper end region; and
    a holder configured for the upper end region of the suspension strut, the holder fastening the suspension strut to the body, and
    wherein the holder is releasably attached to the bodywork element of the body that extends substantially in parallel with a longitudinal extent of the suspension strut in a planar attachment region,
    wherein the planar bodywork element is composed of a sheet metal component which, in a screw-on region, is stiffened by a sheet metal reinforcement plate, and
    bushings, into which screws are screwed, wherein the bushings are welded to the sheet metal component and/or to the sheet metal reinforcement plate.

15. The motor vehicle according to claim 14, wherein the bodywork element in the planar attachment region extends substantially in a longitudinal direction and in a vertical direction of the vehicle.

16. The motor vehicle according to claim 14, wherein the holder is releasably attached to the bodywork element exclusively by screws.

17. The motor vehicle according to claim 16, wherein all of said screws are screwed in substantially in a transverse direction of the vehicle.

18. The motor vehicle according to claim 14, wherein the bushings extend at least between the sheet metal component and the sheet metal reinforcement plate.

19. The motor vehicle according to claim 18, wherein the bushings are welded to the sheet metal reinforcement plate and/or to the sheet metal component.

20. The motor vehicle according to claim 19, wherein the bushings, in the screw-in direction, are supported in a form-fitting manner on the sheet metal reinforcement plate or on the sheet metal component.

\* \* \* \* \*